(12) United States Patent
Yajima et al.

(10) Patent No.: US 9,227,300 B2
(45) Date of Patent: Jan. 5, 2016

(54) HOLLOW SPRING AND METHOD FOR MANUFACTURING SAME

(75) Inventors: Takashi Yajima, Yokohama (JP); Akira Katsuyama, Yokohama (JP)

(73) Assignee: NHK SPRING CO., LTD., Yokohama-shi (JP)

( * ) Notice: Subject to any disclaimer, the term of this patent is extended or adjusted under 35 U.S.C. 154(b) by 302 days.

(21) Appl. No.: 13/988,624

(22) PCT Filed: Nov. 24, 2011

(86) PCT No.: PCT/JP2011/077742
§ 371 (c)(1),
(2), (4) Date: May 21, 2013

(87) PCT Pub. No.: WO2012/074036
PCT Pub. Date: Jun. 7, 2012

(65) Prior Publication Data
US 2013/0241121 A1    Sep. 19, 2013

(30) Foreign Application Priority Data
Dec. 3, 2010  (JP) ................................ 2010-270818

(51) Int. Cl.
*C21D 7/06* (2006.01)
*B24C 1/00* (2006.01)
*B24C 1/10* (2006.01)
(Continued)

(52) U.S. Cl.
CPC ... *B24C 1/00* (2013.01); *B24C 1/10* (2013.01); *B24C 3/327* (2013.01); *F16F 1/00* (2013.01)

(58) Field of Classification Search
CPC ............ B24C 1/00; B24C 3/327; B24C 1/10; F16F 1/00; Y10T 29/49609; Y10T 29/49611; Y10T 29/479; Y10T 29/47
See application file for complete search history.

(56) References Cited

U.S. PATENT DOCUMENTS 8,016,642 B2 *    9/2011  Kuroiwa et al. ................. 451/38
2010/0037976 A1 *  2/2010  Toyotake et al. .............. 138/177
(Continued)

FOREIGN PATENT DOCUMENTS

| JP | A-61-126368  | 6/1986 |
| JP | A-06-050370  | 2/1994 |
| JP | A-2004-154923 | 6/2004 |

(Continued)

OTHER PUBLICATIONS

Mar. 6, 2012 International Search Report issued in International Application No. PCT/JP2011/077742.

*Primary Examiner* — David Bryant
*Assistant Examiner* — Jun Yoo
(74) *Attorney, Agent, or Firm* — Oliff PLC (57) ABSTRACT

A straight-shaped hollow spring material is used in a blasting apparatus. The length of the spring material is set to be 1.5 m to 3.5 m, and the inner diameter of the spring material is set to be not more than 10 mm$\phi$ (not including 0). In inner surface abrasive blasting for the spring material, first and second blastings are performed. In the first blasting, abrasives are ejected to an opening portion of the spring material and are suctioned from a second opening portion thereof. In the second blasting, the abrasives are ejected to the second opening portion and are suctioned from the opening portion. The ejection pressure, the suction pressure, and the like are appropriately set, so that generation of grinding amount difference between the center portion and both end portions of the inner surface of the spring material can be inhibited.

12 Claims, 5 Drawing Sheets

(51) Int. Cl.
  *F16F 1/00* (2006.01)
  *B24C 3/32* (2006.01)

(56) References Cited

U.S. PATENT DOCUMENTS

2010/0281938 A1 11/2010 Tange et al.
2013/0023347 A1* 1/2013 Okada .......................... 464/68.1

FOREIGN PATENT DOCUMENTS

| JP | 2007127227 A | * | 5/2007 |
| JP | A-2007-127227 | | 5/2007 |
| JP | A-2009-125827 | | 6/2009 |

* cited by examiner

HOLLOW SPRING AND METHOD FOR MANUFACTURING SAME

TECHNICAL FIELD

The present invention relates to a hollow spring and a production method therefor. In particular, the present invention relates to an improvement in an abrasive blasting technique for an inner surface thereof.

BACKGROUND ART

In order to reduce the weight of vehicles (cars or the like), it has been proposed that hollow springs (hollow coil springs or the like) be used as spring parts (for example, Patent Document 1). The hollow coil spring of Patent Document 1 is produced by performing a hot hydrostatic extrusion process, a thickness reduction process, a rolling process, a coil forming process, a heating process, an end surface polishing process, a shot peening process, a setting process, and a coating process in turn. In the hot hydrostatic extrusion process, a seamless spring steel pipe is formed. In the hollow coil spring, a spring material (a seamless spring steel pipe or the like) is used, so that fatigue strength to torsional stress and bending stress can be improved.

Patent Document 1 is Japanese Unexamined Patent Application Publication No. 2007-127227.

DISCLOSURE OF THE INVENTION

Problems Solved by the Invention

However, since a spring material having a smaller diameter and a greater thickness is used as a material of a hollow coil spring, small defects may appear on a surface thereof in working. The defects may deteriorate product strength, so that removal of the defects may be necessary. In particular, in recent years, in order to improve durability, removal of defects on an inner surface of a hollow coil spring is required. For example, it is desirable that surface roughness Ra be reduced to be 20 μm or less.

It is thought that if a belt having abrasive paper applied on a surface thereof is inserted into a spring member, the belt will reciprocate in the spring member, and inner surface of the spring member is thereby polished. However, this method requires much time and is not suitable for mass production.

Therefore, an object of the present invention is to provide a hollow spring and a production method therefor which can improve the durability and efficiency of inner surface abrasive blasting for spring material.

Means for Solving the Problems

The inventors intensively researched application of inner surface grinding by blasting to a spring member of a hollow spring. The inner surface grinding by conventional blasting cannot be used for small diameter pipes (spring members of hollow springs which are long and have a smaller inner diameter or the like). However, the inventors found that a method of blasting can be improved and the blasting can be used for spring materials which have lengths of 1.5 m to 3.5 m and inner diameters of not more than 10 mmφ (not including 0), so that the present invention was made.

According to one aspect of the present invention, a production method for a hollow spring includes: a preparing step in which a straight-shaped hollow spring material is prepared; and an abrasive blasting step in which abrasives are ejected to an inner surface of the spring material and are suctioned, and the inner surface of the spring material is thereby ground, wherein in the preparing step of the spring material, length of the spring material is set to be 1.5 m to 3.5 m, and an inner diameter of the spring material is set to be not more than 10 mmφ) (not including 0), in the abrasive blasting step, a first blasting and a second blasting are performed as the blasting in turn, in the first blasting, the abrasives are ejected to one end portion of the spring material and are suctioned from another end portion of the spring material, and in the second blasting, the abrasives are ejected to the another end portion of the spring material and are suctioned from the one end portion of the spring material.

In the production method for hollow spring of the above aspect of the present invention, the blasting is performed in which the abrasives are ejected to the inner surface of the spring material and are suctioned, so that the inner surface of the spring material is ground. Thus, defects at the inner surface of the spring material can be removed. In this case, the surface roughness Ra can be reduced to 20 μm or less. Thus, the durability of the hollow spring can be improved. Since the blasting is used, the efficiency of the inner surface abrasive blasting for the spring material can be realized. As a result, mass production can be realized.

In this case, in the abrasive blasting, in a case in which a spring member may be long, when abrasives are ejected from only one end portion of the spring member (that is, the ejection direction of the abrasives is set at only one direction), another end portion side (suction side) of inner surface of the spring member may be more ground than one end portion side (ejection side) of inner surface of the spring member. Due to this, the inner surface of the spring material may have a trumpet shape.

In contrast, in the production method for hollow spring of the above aspect of the present invention, in the first blasting, abrasives are ejected to the one end portion of the spring material and, are suctioned from the another end portion of the spring material, and then in the second blasting, abrasives are ejected to the another end portion of the spring material and are suctioned from the one end portion of the spring material. In this manner, two directions are used as the ejection direction of the abrasives, so that the inner surface of the spring material can be prevented from having a trumpet shape. In the production method for hollow spring of the above aspect of the present invention, in the first blasting and the second blasting, in accordance with the parallelism of the inner surface of the spring material, the surface roughness thereof, the processing speed, and the like, the ejection pressure, the suction pressure, the density of the abrasives, the particle sizes thereof, the processing time period, and the like are appropriately set, so that generation of grinding amount difference between the center portion and both end portions of the inner surface of the spring material can be inhibited.

Specifically, when the processing time period of the first blasting and the second blasting are short, both end portions will be more ground than the center portion. As the surface is smoother, the grinding effects will be less (that is, as the surface is rougher, the grinding effects will be greater), so that when the processing time period of the first blasting and the second blasting are longer, the center portion of which the surface is rougher than those of both end portions is ground than the both end portions. Thus, the difference of the inner diameter reduction amount between at the center portion and at the both end portions can be less. The processing time period of the first blasting and the second blasting are appropriately set, so that for example, the inner diameter reduction amount of the center portion of the inner surface of the spring material can be set to be 190 µm and the inner diameter reduction amount of the both end portions of the spring material can be set to be 200 µm. Thus, the inner diameter reduction amount difference between the center portion and the both end portions can be 10 µm, and the inner diameter reduction amount difference therebetween can be much less.

As described above, in the production method for hollow spring of the above aspect of the present invention, the method of blasting is improved, so that the spring material, which is a small diameter pipe for which the conventional blasting could not be used, can be subjected to inner surface grinding by the blasting. The uniformity of the grinding amount of the entire inner surface can be improved.

The production method for hollow spring of the present invention can use various structures. According to one desirable embodiment of the present invention, the spring material may be formed into a coil shape after the abrasive blasting step for the spring material.

According to another aspect of the present invention, a hollow spring is formed by the production method for hollow spring of the present invention. The hollow spring of the above aspect of the present invention is not limited to a hollow coil spring, and various modifications can be performed on the hollow spring. For example, the hollow spring may be a straight-shaped hollow spring or a hollow spring having a curved portion.

Effects of the Invention

According to the production method for hollow spring of the present invention, the durability of the hollow spring can be improved, the efficiency of the inner surface abrasive blasting for the spring material can be realized, and the uniformity of the grinding amount of the entire inner surface can be improved. According to the hollow spring of the present invention, the durability of the hollow spring can be improved, and the uniformity of the grinding amount of the entire inner surface can be improved.

EXPLANATION OF REFERENCE NUMERALS

Reference numerals 100 denotes a blasting apparatus, 101 denotes a compressor pipe, 102 denotes a pressure application tank, 103 denotes an ejection side valve, 104 denotes a suction side valve, 105 denotes a receiver portion, 106 denotes a collection pipe, 107 denotes a wear-resistant hose, 108 denotes a collection pipe, 109 denotes a cyclotron separator, 110 denotes a dust collection pipe, 111 denotes a high vacuum dust collector, 112 denotes a vacuum pipe, W denotes a spring member, and Wa and Wb denote an opening portion.

EMBODIMENTS OF THE INVENTION (1) Structure of Blasting Apparatus

Figure 1:
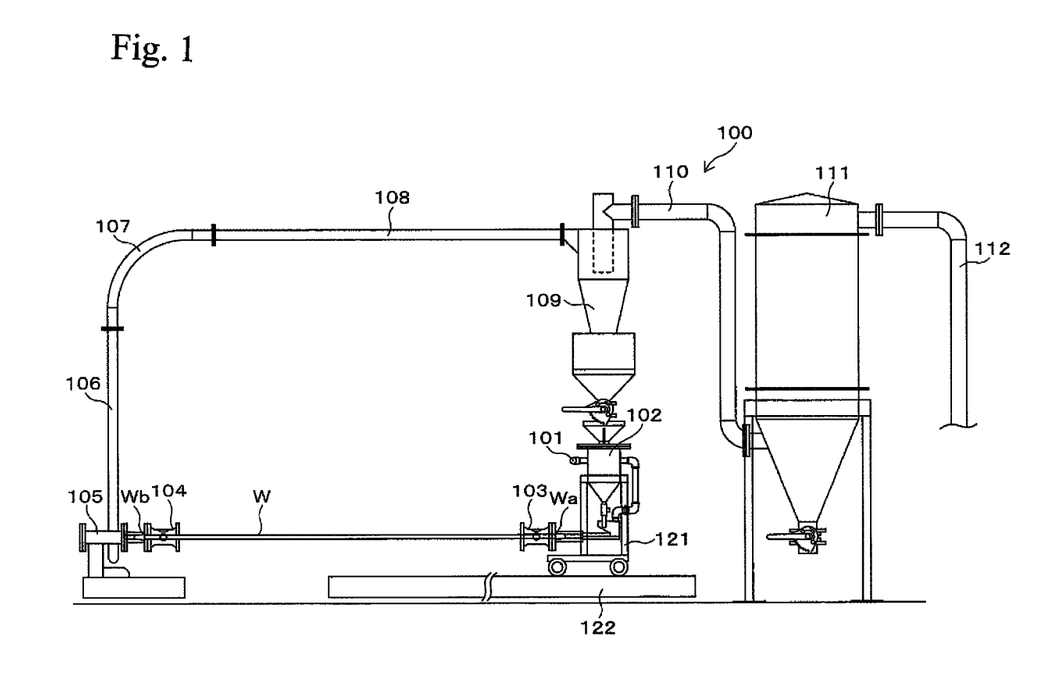
FIG. 1 is a diagram showing a schematic structure of a blasting apparatus using an inner surface abrasive blasting method of one embodiment according to the present invention.

One embodiment of the present invention will be described with reference to the Figures hereinafter. FIG. 1 is a diagram showing a schematic structure of a blasting apparatus using an inner surface abrasive blasting method of one embodiment according to the present invention. For example, the blasting apparatus 100 is equipped with a pressure application tank 102 into which compressed air is supplied through a compressor pipe 101. In the pressure application tank 102, the abrasives and the compressed air are mixed. An ejection side valve 103 is provided at the application tank 102. For example, an opening portion Wa of one end portion of a hollow spring material W is connected to the ejection side valve 103. The abrasives are ejected from the ejection side valve 103 to the opening portion Wa of the hollow spring material W. For example, an ejection pressure is adjusted by a pressure of the compression air which is supplied through the compressor pipe 101, an inner diameter of the ejection side valve 103, and the like.

A suction side valve 104 is provided so as to be spaced from the ejection side valve 103. For example, an opening portion Wb of another end portion of the hollow spring material W is connected to the suction side valve 104. The abrasives move while repeatedly colliding with an inner surface of the spring material W, and are suctioned from the suction side valve 104. In this case, grinding debris is generated by collision of the abrasives with the inner surface of the spring material W, and dust (grinding debris and the like) are suctioned together with the abrasives. For example, a suction pressure is adjusted by a vacuum pump, an inner diameter of the suction side valve 104, and the like. For example, the suction side valve 104 has a function for changing a flow of gas into an eddy flow.

The suction side valve 104 is provided at a receiver portion 105. A cyclotron separator 109 is connected to suction side valve 104 via a collection pipe 106, a wear-resistant hose 107, and a collection pipe 108.

The cyclotron separator 109 is an apparatus for separating the abrasives and the dust by a negative pressure gas flow. A high vacuum dust collector 111 is connected to an upper end portion of the cyclotron separator 109 via a dust collection pipe 110. The vacuum pump (not shown in the Figures) is connected to the high vacuum dust collector 111 via a vacuum pipe 112. The dust is discharged into the high vacuum dust collector 111. The negative pressure gas flow in the cyclotron separator is obtained by the action of the vacuum pump.

The pressure application tank 102 is connected to a lower end portion of the cyclotron separator 109, and the abrasives separated at the cyclotron separator 109 are supplied to the pressure application tank 102. The pressure application tank 102 is fixed at a carriage 121. The carriage 121 is movable in the left direction and the right direction on a base 122, and the position of the carriage 121 can be set in accordance with length of the spring material W.

(2) Inner Surface Abrasive Blasting Method by Blasting Apparatus

For example, the hollow spring material W, which is used in the blasting apparatus 100, is a straight-shaped spring member. The length of spring material W is set to be 1.5 m to 3.5 m, and the inner diameter of the spring material W is set to be not more than 10 mmφ (not including 0). For example, a seamless spring steel pipe is used as the spring material. In inner surface abrasive blasting, in order to stabilize grinding amount, it is necessary that particle size of the abrasives be maintained at predetermined value.

In an inner surface abrasive blasting method using the blasting apparatus 100, first, first blasting is performed. In the first blasting, as shown in FIG. 1, the opening portion Wa of the hollow spring material W is connected to the ejection side valve 103, and the opening portion Wb of the hollow spring material W is connected to the suction side valve 104.

Next, compressed air is supplied into the pressure application tank 102 through the compressor pipe 101, and the inside of the pressure application tank 102 is pressurized by the compressed air. The abrasives in the pressure application tank 102 are ejected to the opening portion Wa at a predetermined ejection pressure value. Since an eddy flow is generated by the suction side valve 104 at the inside of the spring material W, the abrasives, which were injected from the opening portion Wa, move toward the suction side valve 104 while repeatedly colliding with the inner surface of the spring material W. The abrasives are suctioned from the opening portion Wb by the action of the vacuum pump or the like at a predetermined suction pressure value. Thus, the abrasives perform grinding on the whole inner surface of the spring material W. The dust (grinding debris and the like), which was generated by the grinding, is suctioned from the suction side valve 104 together with the abrasives.

The abrasives and the dust arrive at the cyclotron separator 109 via the receiver portion 105, the collection pipe 106, the wear-resistant hose 107, and, the collection pipe 108. The cyclotron separator 109 separates the abrasives and the dust. The separated abrasives are supplied to the pressure application tank 102 and reused. The separated dusts are discharged to the high vacuum dust collector 111.

After the above first blasting performed for a predetermined time period, second blasting is performed. In the second blasting, the disposed direction of the spring material W is set to be opposite to the direction shown in FIG. 1. The opening portion Wb of the hollow spring material W is connected to the ejection side valve 103 and the opening portion Wa of the hollow spring material W is connected to the suction side valve 104. Next, for example, the second blasting is performed in the same condition as that of the first blasting. After the inner surface grinding by the above blasting is performed on the spring material W, for example, the spring material W may be formed into a coil shape by coil forming, or a curved portion is formed at the spring material W by bending. Next, if necessary, the spring material W is subjected to various processing (heating, coating, and the like), so that a hollow spring is produced.

In this embodiment, the blasting is performed in which the abrasives are ejected to the inner surface of the spring material W and are suctioned, so that the inner surface of the spring material W is ground. Thus, defects at the inner surface of the spring material W can be removed. In this case, the surface roughness Ra can be reduced to 20 μm or less. Thus, the durability of the hollow spring can be improved. Since the blasting is used, the efficiency of the inner surface abrasive blasting for the spring material W can be realized. As a result, mass production can be realized.

In this case, in the abrasive blasting, two directions are used as the ejection direction of the abrasives, so that the inner surface of the spring material W can be prevented from having a trumpet shape. In this embodiment, in the first blasting and the second blasting, in accordance with the parallelism of the inner surface of the spring material W, the surface roughness thereof, processing speed, and the like, the ejection pressure, the suction pressure, the density of the abrasives, the particle sizes thereof, the processing time period, and the like are appropriately set, so that generation of grinding amount difference between the center portion and both end portions of the inner surface of the spring material can be inhibited. For example, inner diameter reduction amount of a center portion of the inner surface of the spring material can be set to be 190 μm and inner diameter reduction amount of both end portions of the spring material can be set to be 200 μm by the blasting. The inner diameter reduction amount difference between the center portion and both end portions can be 10 μm, and the inner diameter reduction amount difference therebetween can be much less.

As described above, the method of blasting is improved, so that the spring material W, which is a small diameter pipe for which the conventional blasting could not be used, can be subjected to inner surface grinding by the blasting. Thus, the uniformity of the grinding amount of the entire inner surface can be improved.

EXAMPLES

The embodiment of the present invention will be explained in detail with reference to specific examples hereinafter.

(1) First Example

In the first example, a blasting apparatus having a structure of the embodiment was used, and inner surface grinding by blasting was performed under various conditions. Specifically, in samples 11 to 14, a steel pipe (having an inner diameter of 8 mm and a thickness of 4 mm) was used as a spring member, and as shown in FIG. 1, blasting conditions were changed, and inner surface abrasive blasting was performed. A steel pipe, which was not subjected to blasting, was used as comparative example 11. Alumina abrasive particles were used as abrasives. In Table 1 and FIGS. 2 to 4, "mark" shows the experimental conditions and the measurement results at a position having a punch mark, and "no mark" shows the experimental conditions and the measurement results at a position having no punch mark. Regarding processing conditions in Table 1, "#20×3 minutes" shows that blasting using alumina abrasive particles (particle size: #20) was performed for 3 minutes, and "#20×2 minutes-#80×1 minute" shows that blasting using alumina abrasive particles (particle size: #20) was performed for 2 minutes and then blasting using alumina abrasive particles (particle size: #80) was performed for 1 minute.

TABLE 1

| sample name | position | length | processing condition (abrasive particle size × processing time period) |
|---|---|---|---|
| sample 11 | mark | 195 mm | #20 × 3 minutes |
|  | no mark | 195 mm | #20 × 3 minutes |
| sample 12 | mark | 195 mm | #20 × 3 minutes |
|  | no mark | 195 mm | #20 × 3 minutes |
| sample 13 | mark | 195 mm | #20 × 2 minutes-#80 × 1 minute |
|  | no mark | 195 mm | #20 × 2 minutes-#80 × 1 minute |
| sample 14 | mark | 195 mm | #20 × 2 minutes-#80 × 1 minute |
|  | no mark | 195 mm | #20 × 2 minutes-#80 × 1 minute |
| comparative sample 11 | — | 2400 mm | — |

Thickness Measurement

Regarding samples 11 to 14, thickness of end portion of spring member was measured by a micrometer. In the samples 11 and 12, the thickness before the blasting was an average of 4.00 mm, the thickness after the blasting was an average of 3.93 mm, and grinding amount was 70 μm. In the samples 13 and 14, the thickness before the blasting was an average of 3.99 mm, the thickness after the blasting was an average of 3.91 mm, and grinding amount was 80 μm. In this manner, in all of the samples 11 to 14, the thickness of about 50 to 100 um was reduced. Even when the blasting was performed, uneven thickness ratio was not greatly changed. Thus, it was confirmed that the influence on uneven thickness ratio by the blasting was less than the influence of the spring itself. In the thickness and the uneven thickness ratio, no distinct difference due to the blasting conditions was observed.

Eddy-current Inspection

Figure 2:
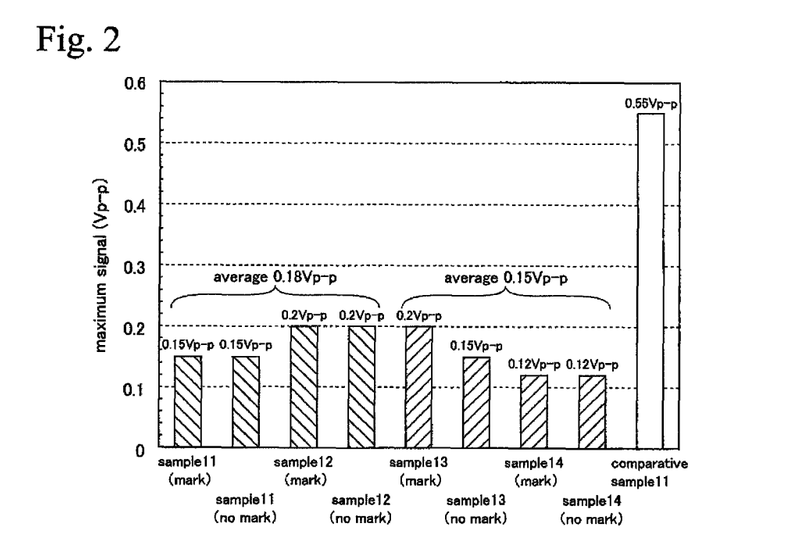
FIG. 2 is a graph showing eddy current examination results in a first example and showing data of maximum signal Vp-p of each sample.

Eddy-current inspection was performed on the samples 11 to 14 and the comparative example 11. In the eddy-current inspection, examination frequency was set at 300 kHz. The results are shown in FIG. 2. FIG. 2 is a graph showing data of maximum signal Vp-p of ECT of each sample. As is understood from FIG. 2, the base noise level of the samples 11 to 14 was reduced to about ⅓ in comparison with that of the comparative example 11. In this manner, in the samples 11 to 14, the base level noise was reduced. It is thought that this is because the inner surface of the spring member was ground, the thickness of about 50 to 100 μm was reduced, and evenness of structure due to surface layer decarburization was thereby reduced. In the base level noise, no distinct difference due to the blasting conditions was observed. It was confirmed that the base level noise was the same level as that of the case in which inner surface grinding using abrasive paper of #600 was performed.

Cross Section Observation

Figure 3:
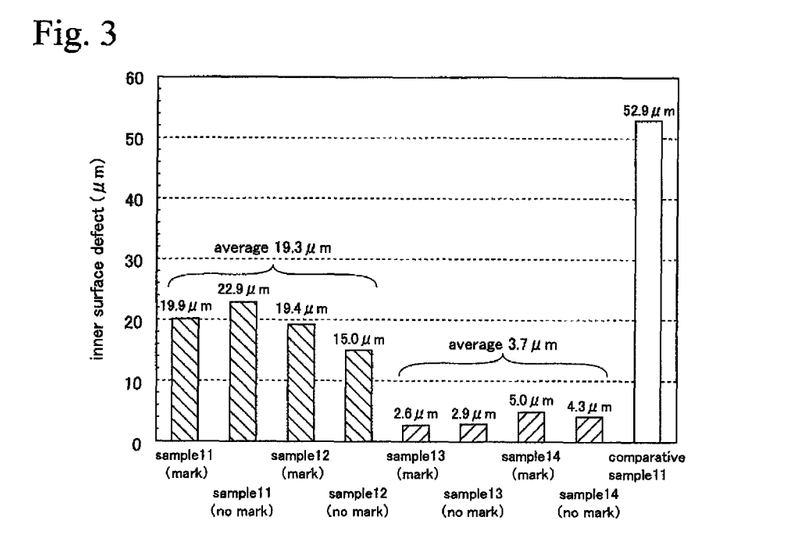
FIG. 3 is a graph showing cross section observation results in a first example and showing data of depth of inner surface damage of each sample.
Figure 4:
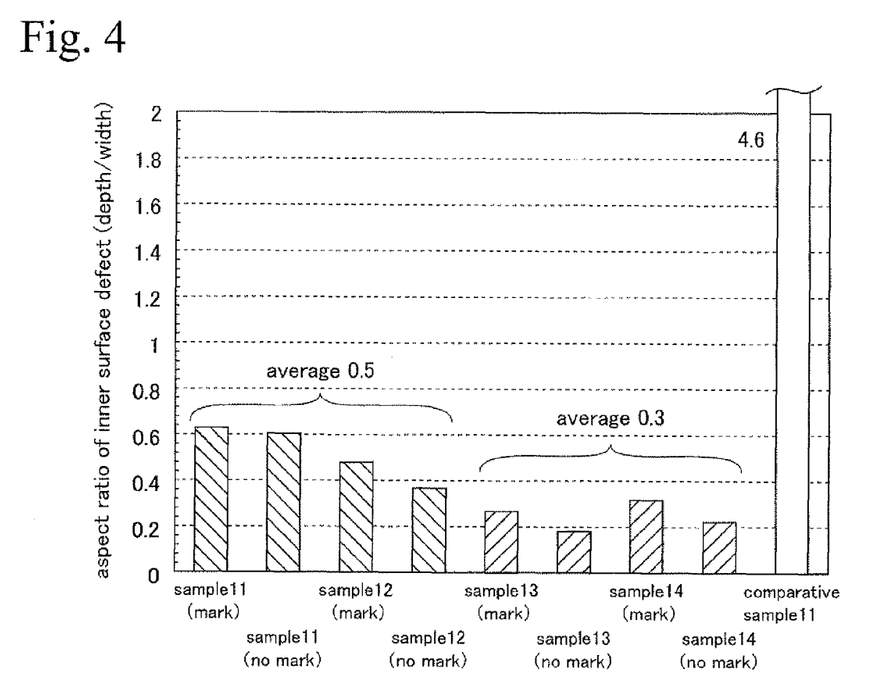
FIG. 4 is a graph showing cross section observation results in a first example and showing data of aspect ratio of inner surface damage of each sample.

Cross section observation using an optical microscope was performed on the samples 11 to 14 and the comparative example 11. The results are shown in FIGS. 3 and 4. FIG. 3 is a graph showing data of depth of inner surface defect of each sample. FIG. 4 is a graph showing data of aspect ratio of inner surface defect of each sample.

As is understood from FIG. 3, the depth of inner surface defect of the comparative example 11 was 52.9 μm. In contrast, the depth of inner surface defect of the examples 11 and 12 subjected to surface finishing using alumina abrasive particles (particle size: #20) was an average of 19.3 μm, and was not more than 20 μm. The depths of inner surface defect of the examples 13 and 14 subjected to surface finishing using alumina abrasive particles (particle size: #80) was an average of 3.7 μm, and was not more than 5 μm. It was confirmed that the depths of inner surface defect of the examples 11 to 14 were greatly reduced. It was confirmed that the depths of inner surface defect of the examples 13 and 14 subjected to surface finishing using alumina abrasive particles (particle size: #80) were more reduced than those of examples 11 and 12 subjected to surface finishing using alumina abrasive particles (particle size: #20).

As is understood from FIG. 4, the aspect ratio (the depth of defect shape/width of defect shape) of inner surface defect of the comparative example 11 was 4.6. In contrast, the aspect ratio of inner surface defect of the examples 11 and 12 was average of 0.5. The aspect ratios of inner surface defect of the examples 13 and 14 were an average of 0.3. It was confirmed that the widths of inner surface defect of the examples 11 to 14 were greater and the aspect ratios of the examples 11 to 14 were less than that of the comparative example 11. It was confirmed that the aspect ratios of inner surface defect of the examples 13 and 14 subjected to surface finishing using alumina abrasive particles (particle size: #80) were less than those of examples 11 and 12 subjected to surface finishing using alumina abrasive particles (particle size: #20).

SEM Observation

Figure 5:
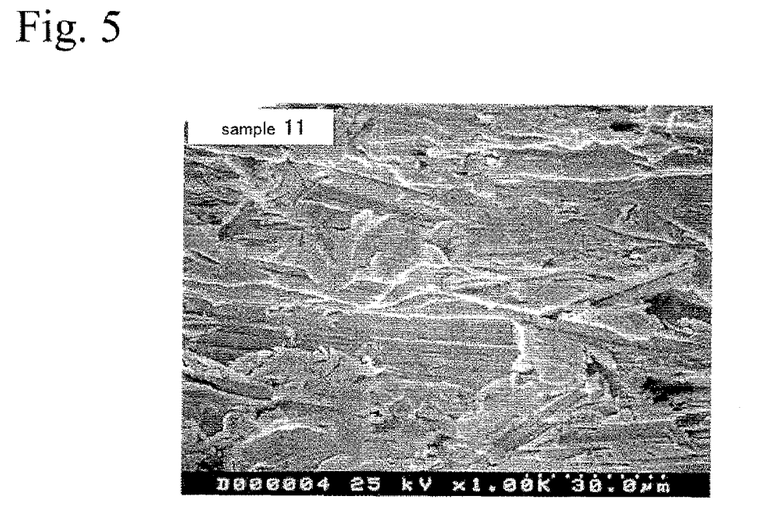
FIG. 5 is a SEM image showing surface observation result of sample 11 in a first example.
Figure 6:
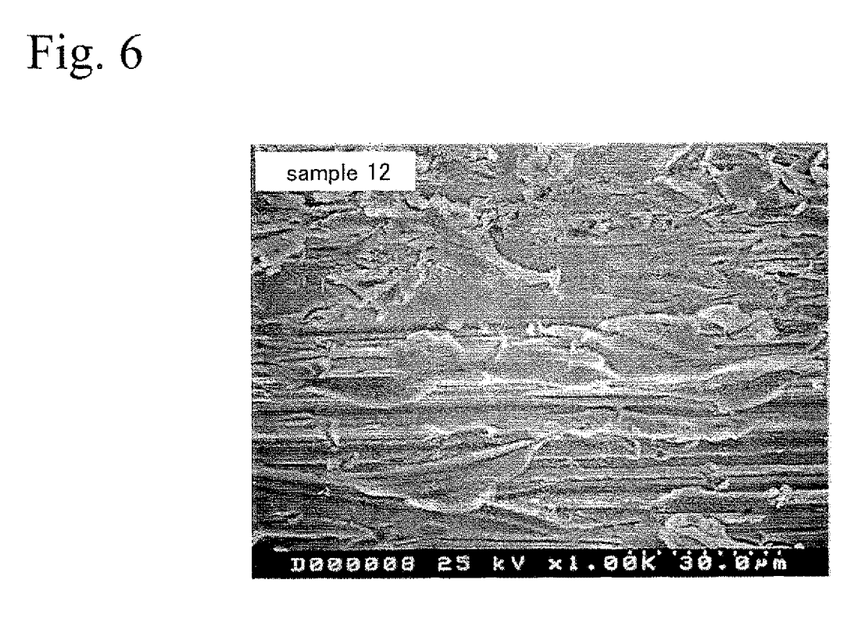
FIG. 6 is a SEM image showing surface observation result of sample 12 in a first example.
Figure 7:
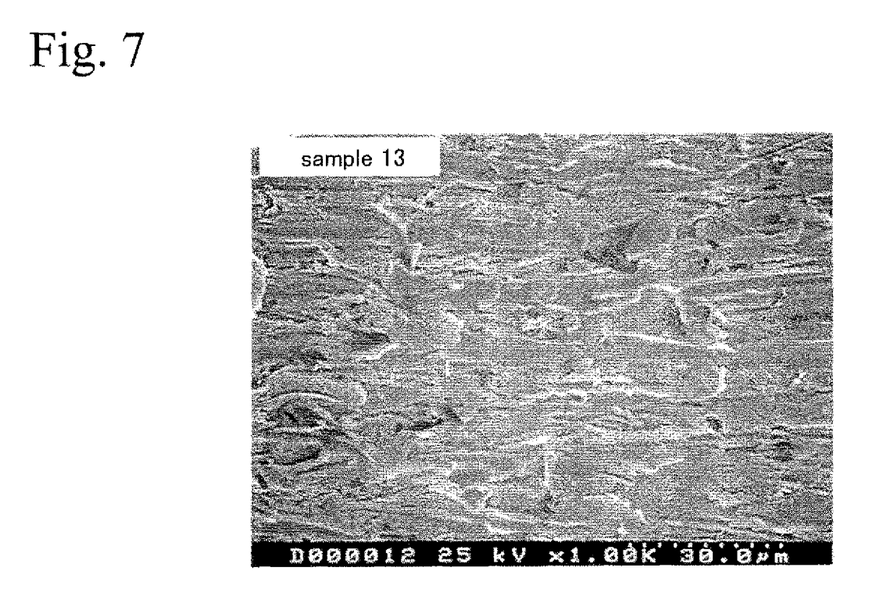
FIG. 7 is a SEM image showing surface observation result of sample 13 in a first example.
Figure 8:
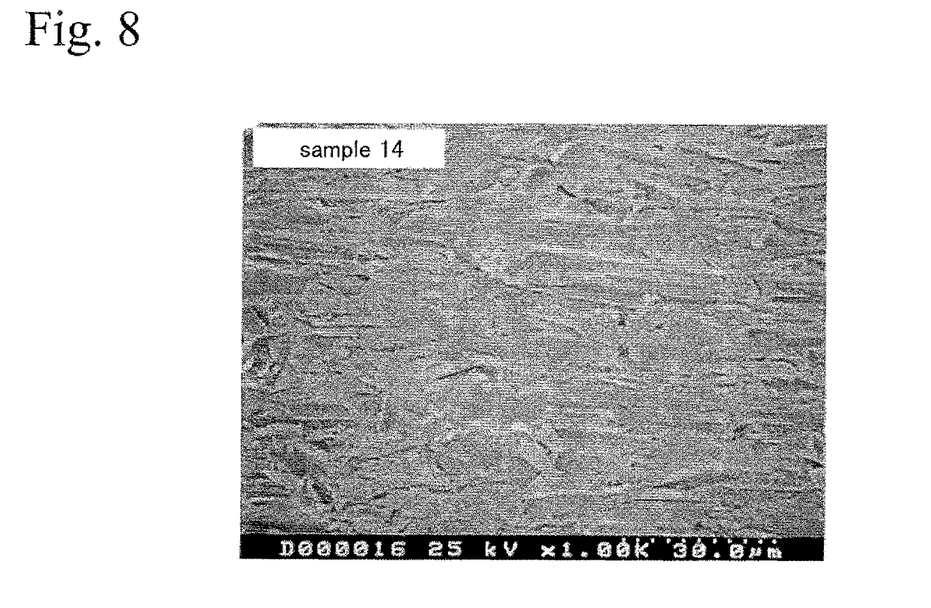
FIG. 8 is a SEM image showing surface observation result of sample 14 in a first example.
Figure 9:
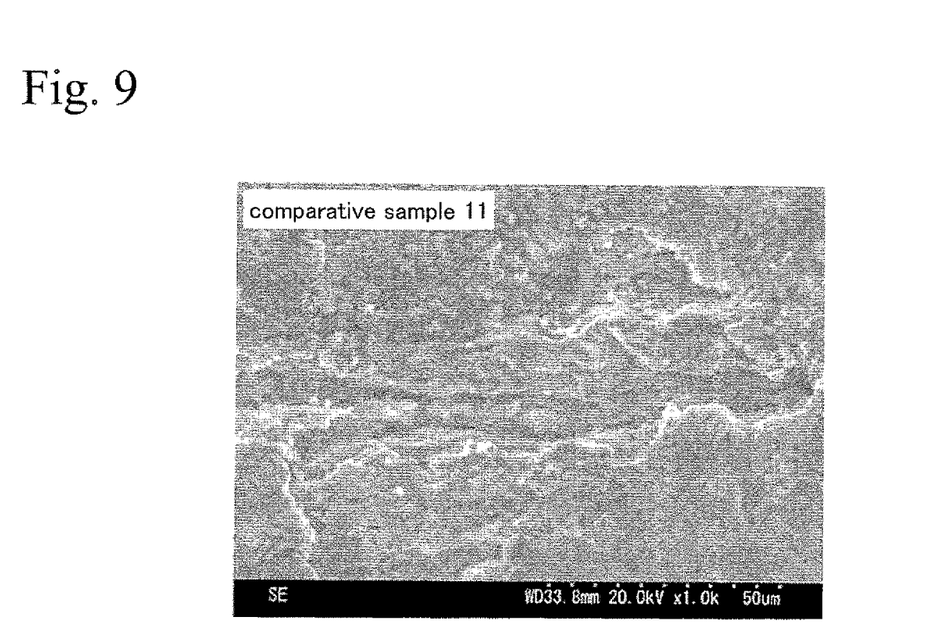
FIG. 9 is a SEM image showing surface observation result of comparative sample 11 in a first example.

Surface observation of inner surface by SEM was performed on the samples 11 to 14 and the comparative example 11. The results are shown in FIGS. 5 to 9. FIG. 5 is a SEM image showing surface observation results of sample 11, FIG. 6 is a SEM image showing surface observation results of sample 12, FIG. 7 is a SEM image showing surface observation results of sample 13, FIG. 8 is a SEM image showing surface observation results of sample 14, and FIG. 9 is a SEM image showing surface observation results of comparative sample 11. In the surface observation, observation magnification by SEM was set at 1000-fold magnification.

In the comparative sample 11, as shown in FIG. 9, larger wrinkle defects were observed. However, in the samples 11 to 14, as shown in FIGS. 5 to 8, larger wrinkle defects were not observed. In the samples 11 to 14, wrinkle defects were removed since the inner surface thereof was ground such that the thickness of about 50 to 100 μm was reduced as described above. The surface roughness in the examples 13 and 14 subjected to surface finishing using alumina abrasive particles (particle size: #80) was less than the surface roughness in the examples 11 and 12 subjected to surface finishing using alumina abrasive particles (particle size: #20).

According to the above results, it was confirmed that the inner surface defects can be reduced and the depths thereof (surface roughness Ra) could be set at 20 μm or less by performing the inner surface grinding by the blasting on the spring member. In particular, it was confirmed that the depths of the inner surface defects can be set at 5 μm or less when the surface finishing using alumina abrasive particles (particle size: #80) was performed. It was confirmed that the widths of inner surface defects can be less in the inner surface grinding by the blasting. As a result, it was confirmed that the inspection accuracy and durability of the spring can be improved. It was confirmed that the case of the surface finishing using alumina abrasive particles (particle size: #80) is more advantageous in durability improvement than the case of the surface finishing using alumina abrasive particles (particle size: #20).

(2) Second Example

In the second example, a blasting apparatus having a structure of the embodiment was used, inner surface abrasive blasting was performed under various conditions, and the inner diameter reduction amounts were examined.

In samples 21 and 22 and comparative examples 21 and 22, a steel pipe (having an inner diameter of 8 mm, a thickness of 4 mm, and a length of 2000 mm) was used as a spring member, alumina abrasive particles (particle size: #24) were used as abrasive particles, and, as shown in Table 2, the ejection pressure, the processing time period, and the ejection direction of the abrasive particles were changed, and inner surface abrasive blasting was performed. Table 2 shows the inner diameter reduction amounts measured after the inner surface abrasive blasting. The inner diameter reduction amounts are increased amounts of inner diameter by the inner surface abrasive blasting (=(inner diameter after the inner surface abrasive blasting)−(inner diameter before the inner surface abrasive blasting). The target value of the inner diameter reduction amount was set at 100 μm or more.

Regarding processing time period shown in Table 2, for example, "120 sec (one direction)" shows that the ejection direction of the abrasive particles was set at only one direction and only the first blasting of the embodiment was performed for 120 seconds, and "60 sec×2 (two directions)" shows that the ejection direction of the abrasive particles was set at two directions, the first blasting of the embodiment was performed for 60 seconds and the second blasting of the embodiment was performed for 60 seconds.

TABLE 2

| sample name | processing pressure | processing time period (ejection direction) | inner diameter reduction amount |
|---|---|---|---|
| sample 21 | 0.5 MPa | 60 sec × 2 (two directions) | center portion: 70 µm end portion: 100 µm |
| sample 22 | 0.5 MPa | 90 sec × 2 (two directions) | center portion: 190 µm end portion: 200 µm |
| comparative sample 21 | 0.1 MPa | 120 sec (one direction) | 30 µm |
| comparative sample 22 | 0.5 MPa | 120 sec (one direction) | 60 to 70 µm |

As is understood from Table 2, when only the first blasting of the embodiment was performed, in the comparative example 21 in which the ejection pressure was set at 0.1 MPa, the inner diameter reduction amount was 30 µm, and was much less than the target value. In the comparative example 22 in which the ejection pressure was set at 0.5 MPa, the inner diameter reduction amount was 60 to 70 µm, and was greater. However, in the comparative example 22, the inner diameter reduction amount at the suction side end portion was greater than that at the ejection side end portion. Thus, great difference in the inner diameter reduction amount was generated between at the suction side end portion and at the ejection side end portion.

In contrast, in the sample 21, the first blasting and the second blasting were performed, the ejection pressure was set in the same manner as in the comparative sample 22, and the total processing time period of the first blasting and the second blasting was set in the same manner as in the comparative sample 22. As a result, the difference in the inner diameter reduction amount was not generated between at the suction side end portion and at the ejection side end portion, and the inner diameter reduction amount at the end portion was 100 µm, and the inner diameter reduction amount at the center portion was 70 µm. Although the inner diameter reduction amount was greater in the above manner, the difference of the inner diameter reduction amount between at the end portion and at the center portion was 30 µm.

Based on the concept that as the surface is smoother, the grinding effects will be less (that is, as the surface is rougher, the grinding effects will be greater), in the sample 22, the respective processing time periods of the first blasting and the second blasting were longer, so that the inner diameter reduction amount at the center portion was 190 µm, and the inner diameter reduction amount at the end portion was 200 µm. In this manner, at the center portion of which the surface was rougher than that of the end portion, the grinding amount was greater than at the end portion, and the difference of the inner diameter reduction amount between at the end portion and at the center portion was 10 µm, thereby being much less.

According to the above results, it was confirmed that in the inner surface abrasive blasting, the ejection direction was changed in the middle of the inner surface abrasive blasting, the first blasting and the second blasting were performed, and the time periods of the first blasting and the second blasting were appropriately set, so that the uniformity of the inner diameter reduction amount can be improved at the entire inner surface. In particular, it was confirmed that by appropriate selection of time period, the inner diameter reduction amount at the center portion was 190 µm, the inner diameter reduction amount at the end portion was 200 µm, and the difference of the inner diameter reduction amount between at the end portion and at the center portion was much less.

The invention claimed is:

1. A production method for a hollow spring, comprising:
   a preparing step in which a straight-shaped hollow spring material is prepared; and
   an abrasive blasting step in which abrasives are ejected to an inner surface of the spring material and are suctioned, and the inner surface of the spring material is thereby ground, wherein
      in the preparing step of the spring material, length of the spring material is set to be 1.5 m to 3.5 m, and an inner diameter of the spring material is set to be not more than 10 mm;
      in the abrasive blasting step, a first blasting and a second blasting are performed as the blasting in turn;
      in the first blasting, the abrasives are ejected from one end portion of the spring material and are suctioned at another end portion of the spring material;
      in the second blasting, the abrasives are ejected from the other end portion of the spring material and are suctioned at the one end portion of the spring material; and
      the first blasting and the second blasting are each performed at an ejection pressure of at least 0.5 MPa for at least 90 seconds.

2. The production method for the hollow spring according to claim 1, wherein
   by the blasting, an inner diameter reduction amount of a center portion of the inner surface of the spring material is set to be 190 µm and an inner diameter reduction amount of both end portions of the spring material is set to be 200 µm.

3. The production method for the hollow spring according to claim 1, wherein
   the spring material is formed into a coil shape after the abrasive blasting step for the spring material.

4. The hollow spring formed by the production method according to claim 1.

5. The production method for the hollow spring according to claim 1, wherein an inner surface of the spring member is ground at a depth of at least 50 µm.

6. The production method for the hollow spring according to claim 1, wherein the abrasives have a particle size of at least #20.

7. The production method for the hollow spring according to claim 1, wherein a depth of an inner surface defect of the hollow spring is not more than 20 µm.

8. The production method for the hollow spring according to claim 1, wherein the abrasives have a particle size of at least #80.

9. The production method for the hollow spring according to claim 1, wherein a depth of an inner surface defect of the hollow spring is not more than 5 µm.

10. The production method for the hollow spring according to claim 1, wherein an aspect ratio of an inner surface defect of the hollow spring, which is a depth of a defect shape/a width of the defect shape, is 0.5 or less.

11. The production method for the hollow spring according to claim 1, wherein an aspect ratio of an inner surface defect of the hollow spring, which is a depth of a defect shape/a width of the defect shape, is 0.3 or less.

12. The production method for the hollow spring according to claim 1, wherein the abrasives are made from alumina.

* * * * *